3,826,800
BASIC INDAZOLE AZO COMPOUNDS

Johannes Dehnert and Guenter Dunkelmann, Ludwigshafen, Germany, assignors to Badische Anilin- & Soda-Fabrik Aktiengesellschaft, Ludwigshafen (Rhine), Germany
No Drawing Filed Sept. 7, 1971, Ser. No. 178,384
Int. Cl. C09b 43/00
U.S. Cl. 260—147                 4 Claims

ABSTRACT OF THE DISCLOSURE

Basic dyes of the indazole series of the formula

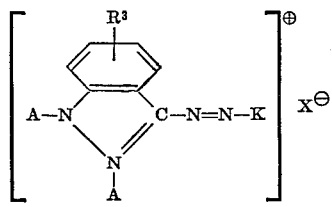

wherein A is methyl, ethyl or a hydroxyethyl group which may be further substituted with the proviso that not more than one A is methyl or ethyl, $R^3$ is hydrogen, methyl, methoxy, chloro, nitro or $SO_2R$ where R is an amino radical, or an alkyl or aryl radical, K is a nitrogeneous coupling component which completes the dye molecule to form a diazacyanine system and $X^\ominus$ is a colorless acid anion. The orange to blue dyes have excellent fastness properties and are suitable for dyeing anionically modified textile fibers, particularly acrylonitrile polymers and polyesters.

---

The invention relates to basic azo dyes having the formula (I):

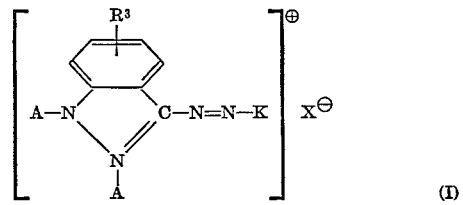

where

A denotes methyl, ethyl or a radical having the formula
—$CH_2$—CHOH—$R^1$ or —$CH_2$—CHOH—$R^2$
  $R^1$ denotes hydrogen, carbamoyl, N-substituted carbamoyl, carboxyl, hydroxymethyl, alkoxymethyl having two to seven carbon atoms, phenoxymethyl or chloromethyl;
  $R^2$ independently of $R^1$ denotes hydrogen, carbamoyl, N-substituted carbamoyl, carboxyl, hydroxymethyl, alkoxy methyl having two to seven carbon atoms, phenoxymethyl or chloromethyl;
  $R^3$ denotes hydrogen, methyl, methoxy, chloro, nitro or $SO_2R$;
  R denotes the radical of ammonia or an unsubstituted or substituted aliphatic, araliphatic, cycloaliphatic, aromatic or saturated heterocyclic amine or an unsubstituted or substituted alkyl or aryl radical;
  K denotes the radical of a nitrogen-containing isocyclic aromatic or heterocyclic aromatic coupling component which makes up the remaining part of the molecule to a diazacyanine system,
  $X^\ominus$ denotes the anion of an inorganic or organic acid and one of the radicals A does not denote methyl or ethyl.

In addition to the meanings already given, $R^1$ or $R^2$ may for example denote the following radicals: N-methylcarbamoyl, N - ethylcarbamoyl, N,N - dimethylcarbamoyl, methoxymethyl, ethoxymethyl, butoxymethyl, β-methoxyethoxymethyl, β - ethoxyethoxymethyl or β-butoxyethoxymethyl.

When the radical $SO_2R$ denotes a substituted sulfonamido group, the radical R may be derived from a primary or secondary amine which may bear other substituents. Examples of such substituents are aryl, aralkyl, alkyl, cycloalkyl, hydroxyl or alkoxy groups, dialkylamino or tetralkylammonium radicals, carboxylic acid, carboxamido or nitrilo groups, acylamino groups, unsubstituted or substituted sulfonamido groups, heterocyclic radicals and also halogen atoms.

Specific substituents for the amines, other than those already mentioned as being suitable, are phenyl, cyclohexyl, benzyl, phenylethyl, methyl, ethyl, methoxy, ethoxy, butoxy, phenoxy, dimethylamino, dibutylamino, tetramethylammonium, N,N - dimethylcarbamoyl, N-methylcarbamoyl, N,N - diethylcarbamoyl, N,N - dimethylsulfonamido, N,N-diethylsulfonamido, N-phenylsulfonamido, acetylamino, propionylamino, chlorine or bromine.

The following are examples of primary and secondary amines: methylamine, dimethylamine, ethylamine, diethylamine, β-hydroxyethylamine, propylamine, butylamine, methyl - β - hydroxyethylamine, γ - methoxypropylamine, benzylamine, phenylethylamine, morpholine, piperidine, N-methylpiperazine, hexamethylenimine, thiomorpholine dioxide, 2,6-dimethylmorpholine, cyclohexylamine, pyrrolidine, piperazine, aniline, N-methylaniline, 4-sulfonamidoaniline, γ - (2 - ethylhexoxy) - propylamine, γ-dimethylaminopropylamine and β-thiomorpholine dioxide ethylamine.

When the $SO_2R$ radical denotes a sulfonic group, R may for example have the following meanings: methyl, ethyl, benzyl, β - cyanoethyl, β - carboxamidoethyl, β - carboxyethyl, β-carbomethoxyethyl, β-carboethoxyethyl, phenyl, p-methylphenyl, o-methylphenyl or p-chlorophenyl.

Compounds which together with the diazo component are capable of forming a diazacyanine system are used as coupling components K. Examples of such coupling components are anilines capable of coupling in the p-position or aminonaphthalenes or heterocycles such as indoles or derivatives of benzothiazole, benzimidazole or trimethylindoline. The coupling components may contain further substituents such as halogen atoms, alkyl groups or alkoxy groups. The amino nitrogen atom of the anilines and aminonaphthalenes is preferably monosubstituted or di-substituted.

The following are specific examples of coupling components:

N-methylaniline,
N-butylaniline,
dimethylaniline,
diethylaniline,
N,N-dibutylaniline,
N,N-di-β-hydroxyethylaniline,
N-methyl-N-β-hydroxyethylaniline,
N-methyl-N-β-cyanoethylaniline,
N-ethyl-N-β-hydroxyethylaniline,
N-ethyl-Nβ-cyanoethylaniline,
N-methyl-N-β-methoxyethylaniline,
N-methyl-N-β-ethoxyethylaniline,
N-ethyl-N-β-methoxyethylaniline,
N-ethyl-N-benzylaniline,
N-ethyl-N-β-phenylethylaniline,
N-β-cyanoethyl-N-benzylaniline,
N-β-hydroxyethyl-N-β-phenylethylaniline,
N-cyclohexylaniline or
N-cyclohexyl-N-β-hydroxyethylaniline, and compounds bearing methyl, ethyl, methoxy, ethoxy, chlorine, acetylamino or propionylamino as substituents in the ortho and/or meta positions to the amino group.

The following are also suitable:

N-methyl-4-ethoxydiphenylamine,
4-acetylaminodiphenylamine,
N-phenylpyrrolidine,
N-phenylmorpholine,
N-phenylthiomorpholine dioxide,
1-phenyl-3,3,5-trimethylpyrazoline,
tetrahydroquinaldine,
2-methyldihydroindole,
indole,
2-methylindole,
1-cyanoethyl-2-methylindole,
2-phenylindole,
1-methyl-2-phenylindole,
1-cyanoethyl-2-phenylindole,
2-phenylindole-1-propionic acid,
2-phenylindole-1-propionamide,
2-cyanomethylbenzimidazole,
1,3-dimethyl-2-cyanomethylenebenzimidazoline,
1,3,3-trimethyl-2-cyanomethyleneindolenine,
1-methyl-4-cyanomethylenedihydropyridine,
2-benzimidazolylacetamide,
di-2-benzimidazolylmethane and
di-2-benzothiazolylmethane.

Examples of aminonaphthalenes are: 1-naphthylamine, 1 - ethylaminonaphthalene, 1 - methylaminonaphthalene, 1 - dimethylaminonaphthalene, 1 - diethylaminonaphthalene, 1 - cyclohexylaminonaphthalene, 1 - benzylaminonaphthalene, 1 - phenylaminonaphthalene, 1 - p - tolylaminonaphthalene, 1 - (p - ethoxyphenylamino) - naphthalene, 1 - (p - β - hydroxyethoxyphenylamino) - naphthalene, 1 - ,(p - methoxyphenylamino) - naphthalene, 1-(p - acetaminophenylamino) - naphthalene and 1 - (p-hydroxyphenylamino)-naphthalene.

The benzene ring of the diazo component may contain, in addition to the $SO_2R$ group, other substituents such as methyl, methoxy, ethyl, ethoxy, acetylamino, benzoylamino, chlorine or bromine.

It is prefered however to use diazo components which do not contain any of these additional substituents.

Examples of suitable anions are chloride, bromide, nitrate, sulfate, methosulfate, ethosulfate, benzenesulfonate, toluenesulfonate, citrate, formate, acetate, tetrachlorozincate or tetrafluoroborate.

The new dyes are blue, violet, red, orange or yellow depending on the coupling component chosen. Since the fastness properties of the new dyes are substantially unaffected by the type of substituents in the sulfonic and sulfonamido groups, all radicals of primary or secondary amines are suitable as substituents for the sulfonamido groups. The amine chosen thus depends mainly on practical considerations, particularly on the effect which the $SO_2R$ substituent is to exert on the affinity and the rate of absorption of the dye.

Dyes having the formula (I) may be prepared for example by reacting a compound having the formula (II):

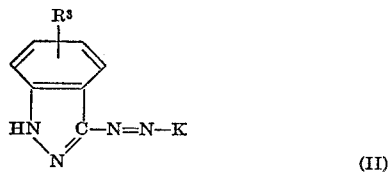

(II)

in which $R^3$ and K have the meanings given above with a compound having the formula (III):

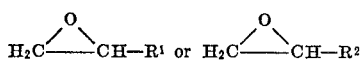

in which $R^1$ and $R^2$ have the meanings given above.

In the case when one of the radicals A denotes methyl or ethyl, the compounds having the formula (II) may first be monoalkylated for example with dimethyl sulfate or diethyl sulfate and the reaction products may be reacted with the compounds having the formula (III). The reverse sequence of alkylation is also possible and in some cases preferred.

Examples of compounds having the formula (III) are: ethylene oxide, 1,2-propylene oxide, epichlorohydrin, glycidamide, glycidyl ethyl ether, glycidyl phenyl ether or glycidyl alcohol.

Reaction of compounds having the formula (II) with compounds having the formula (III) is preferably carried out in acid medium, advantageously in the presence of an organic acid, for example formic acid, acetic acid, propionic acid, benzoic acid or p-toluene-sulfonic acid, but inorganic acids such as sulfuric acid, phosphoric acid or hydrogen halides may be used. These acids may be used in the concentrated commercial form, as dilute solutions in water or mixed with organic solvents with or without water.

When the reaction is carried out in the presence of organic acids the concentrated form of these acids is usually employed, if desired together with organic solvents. Suitable solvents are hydrocarbons such as benzene, toluene or xylene, halogenated aliphatic or aromatic hydrocarbons such as chloroform, ethylene chloride, chlorobenzene or dichlorobenzene, alcohols such as ethanol, ethylene glycol or benzyl alcohol, ketones such as acetone or cyclohexanone, esters such as ethyl acetate, ethers such as ethylene glycol dimethyl ether or dioxane. The reaction may also be carried out in the presence of p-toluenesulfonic acid, boron trifluoride or zinc chloride.

The reaction is advantageously carried out at temperatures of from 0° to 180° C., preferably at 30° to 120° C. The compounds having the formula (II) are preferably wholly or partly dissolved in the acid-containing mixture for the reaction and then a compound having the formula (III) is added either all at once or gradually.

Those of the new dyes are generaly preferred which have the general formula (Ia) or (Ib):

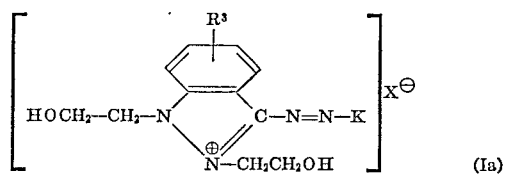

(Ia)

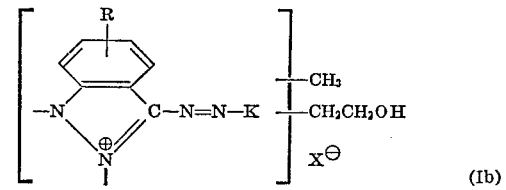

(Ib)

in which $R^3$, $X^-$ and K have the meanings given above.

A group of blue dyes having particular industrial importance has the general formula:

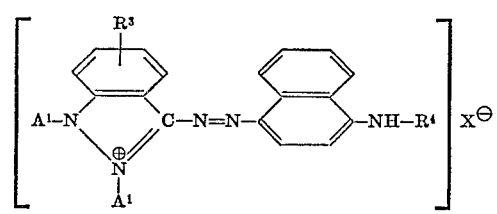

in which $A^1$ denotes methyl or β-hydroxyethyl;
$R^4$ denotes ethyl, cyclohexyl, p-methylphenyl, β-hydroxyethoxyphenyl, p-hydroxyphenyl, p - methoxyphenyl or p-ethoxyphenyl,
one of the radicals $A^1$ not being methyl, and
$R^3$ and $X^-$ have the meanings given for formula (Ia).

Particularly valuable violet to blue dyes have the general formula:

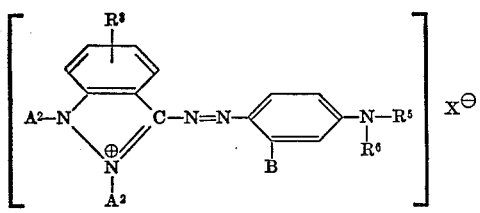

in which

A² denotes methyl, β-hydroxyethyl or β-hydroxy-γ-chloropropyl;
B denotes hydrogen, methyl or acetylamino;
R⁵ denotes hydrogen, methyl, ethyl, butyl, β-hydroxyethyl, β-cyanoethyl, cyclohexyl, benzyl, phenylethyl, phenyl, p-methoxyphenyl or p-ethoxyphenyl; and
R⁶ denotes methyl, ethyl, butyl or β-hydroxyethyl, one of the radicals A² being other than methyl; and
R³ and X⁻ have the meanings given above.

Preferred radicals R³ are hydrogen, chlorine, nitro and SO₂R, the sulfonamides being preferred to the sulfones.

Preferred radicals R are derived from monoalkylamines or dialkylamines having one to eight carbon atoms in all, and the alkyl radicals may bear hydroxy, methoxy, ethoxy or β-hydroxyethoxy as substituents. Cyclohexylamine, aniline, pyrrolidine, piperidine, morpholine, N-methylpiperazine or thiomorpholine-S-dioxide are also suitable.

Specific examples of the first group are methylamine, ethylamine, propylamine, butylamine, dimethylamine, diethylamine, dibutylamine, β - hydroxyethylamine, β - hydroxypropylamine, γ-hydroxypropylamine, N - methyl-N-β-hydroxyethylamine, N-ethyl-N-β-hydroxyethylamine, N-methyl-N-β-methoxyethylamine, N-(β-hydroxy)-ethoxyethylamine, β-methoxyethylamine, γ-methoxypropylamine or γ-ethoxypropylamine.

Particularly valuable orange or red dyes correspond to the general formula:

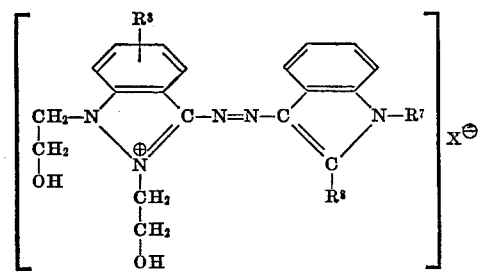

in which R³ and X⊖ have the meanings given for formula (Ia) and R⁷ denotes a hydrogen atom, a methyl group or the radical of a propionic acid, amide or nitrile attached in the β-position and R⁸ denotes a methyl or phenyl group.

The new dye salts are basic dyes which have more or less good solubility in water depending on the type of substitution, the size of the whole molecule and the type of anion. The solubility in water can be controlled to a certain extent by exchanging the anion, for example by preparing the free base from the fairly sparingly soluble dye chloride or methosulfate by means of alkali and then dissolving the free base in an acid whose anion makes the dye better soluble in water. Examples of such acids are nitric acid, formic acid, citric acid, acetic acid and trichloroacetic acid. Conversely the dye salt may be converted into a salt which is sparingly soluble or wholly insoluble in water, for example by introducing into the dye an anion such as tetrafluoroborate or potassium hexacyanoferrate (II) or an anion derived from a heteropolyacid or a dye containing a sulfonic acid group. New dyes having hydroxyalkyl groups generally have better solubility in water than comparable dyes having alkyl groups.

The soluble new dyes may be used in the form in which they are obtained by the synthesis or in a finished or dispersed form for dyeing textile material such as mordanted cotton, leather and materials such as fibers, flock, filaments threads, sheeting, film, spun goods, woven and knitted cloth of synthetic materials such as cellulose esters, cellulose ethers, polyamides or polyesters, especially when these have been modified by incorporation of anionic groups. They are particularly suitable for dyeing polyacrylonitrile and copolymers of acrylonitrile and also anionically modified polyesters, very fast dyeings being obtained.

The following Examples illustrate the invention. Parts and percentages relate to weight unless otherwise stated.

EXAMPLE 1

A slow stream of ethylene oxide is passed for several hours at 60° C. into a solution of 21 parts of the compound having the formula:

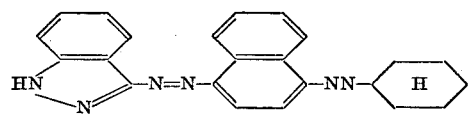

in 200 parts of glacial acetic acid until complete alkylation to the blue dye has taken place as shown by thin layer chromatography. The reaction mixture is then introduced into 2000 parts of water and the product having the formula:

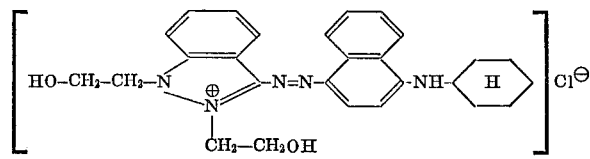

is precipitated by adding 350 parts by volume of sodium chloride solution, isolated and dried. A dark blue powder is thus obtained which dissolves readily in water and dyes acrylonitrile polymers outstandingly fast blue shades.

EXAMPLE 2

45 parts of epichlorohydrin is added to 20.5 parts of the coupling product of 3-aminoindazole and p-ethoxyphenyl-α-naphthylamine in 200 parts of glacial acetic acid and the whole is heated to 60° C. Another 45 parts of epichlorohydrin is added over twelve hours in order to complete the reaction. After it has been established by thin layer chromatography that quantitative reaction to the quaternary dye:

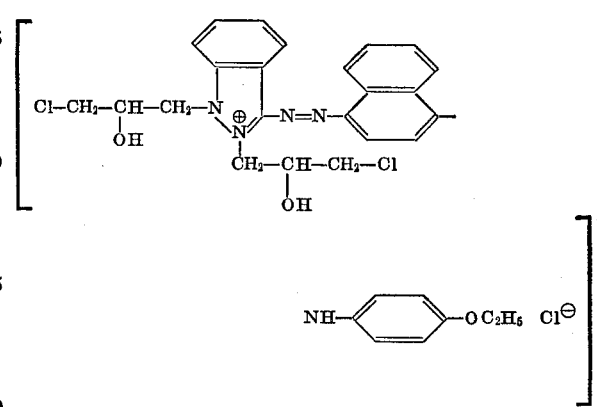

has taken place, the reaction mixture is allowed to flow into 3000 parts of water and the product is precipitated with 150 parts of saturated salt solution. The dried and ground dye dyes acrylonitrile polymers fast blue shades.

EXAMPLE 3

26 parts of the coupling product having the formula:

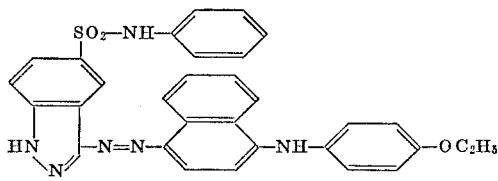

in 200 parts of glacial acetic acid is reacted with ethylene oxide at 60° C. and the quaternary dye crystallizes out from the reaction mixture. The dye powder obtained after isolation and drying dissolves well in hot water and gives outstandingly fast blue shades on acrylonitrile polymers.

EXAMPLE 4

75 parts of phenyl glycidyl ether is added to a solution of 20 parts of the compound:

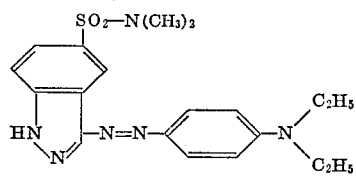

in 200 parts of glacial acetic acid and the whole is heated at 60° C. until according to a thin layer chromatogram a complete reaction has taken place. 25 parts of zinc chloride is then added to the reaction mixture, the whole is introduced into 1000 parts of ice-water and the deposited dye is isolated in the usual way. It dyes acrylonitrile polymers fast violet shades.

EXAMPLE 5

Ethylene oxide is passed into a solution of the coupling product of 3-aminoindazole→2-phenylindole in 200 parts of glacial acetic acid at 60° C. until the quaternization is completed according to a thin layer chromatogram. The reaction mixture is then diluted with 250 parts of water and the dye is precipitated by adding 1200 parts by volume of 50% sodium acetate solution, suction filtered and dried. A reddish brown powder is obtained which gives scarlet dyeings on acrylonitrile polymers.

EXAMPLE 6

11 parts of the coupling product having the formula:

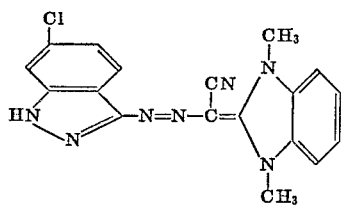

is quaternized in 100 parts of glacial acetic acid with ethylene oxide at 60° C. After the reaction is completed, the reaction mixture has 80 parts of zinc chloride in 250 parts of water added to it, the quaternization product is precipitated with 1200 parts by volume of saturated sodium chloride solution, suction filtered, washed with water and dried. The brown dye gives bright yellow shades when dyed onto acrylonitrile polymers.

EXAMPLE 7

40 parts of the compound having the formula:

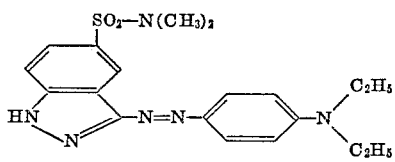

is monoalkylated at 60° C. in 300 parts of glacial acetic acid with 43 parts of glycidamide. After the reaction is over, the mixture is introduced into 2000 parts of water and the deposited dye is isolated.

14.5 parts of the dried compound obtained is reacted in 150 parts of glacial acetic acid at 60° C. with ethylene oxide in the usual way. After complete quaternization has been confirmed by thin layer chromatography, the reaction mixture is introduced into a mixture of 3000 parts of zinc chloride and 200 parts of water. The dye is isolated and dried as usual and gives an outstandingly fast violet dyeing on acrylonitrile polymers.

EXAMPLE 8

14.5 parts of the compound obtained according to the first paragraph of Example 7 is quaternized in 200 parts by volume of chloroform with 37.8 parts of dimethyl sulfate with an addition of 3 parts of sodium carbonate at the boiling point. When the reaction is over the chloroform is evaporated and the residue is dissolved in 200 parts of 30% acetic acid. The dye is precipitated by adding 500 parts by volume of saturated sodium chloride solution, suction filtered, washed with water and dried. Violet dyeings having good fastness properties are obtained therewith on acrylonitrile polymers.

EXAMPLE 9

20.5 parts of the azo compound having the formula:

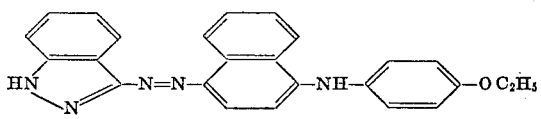

is methylated in 200 parts by volume of dioxane with 26 parts of dimethyl sulfate and 5 parts of magnesium oxide at 60° C. until chromatographic examination indicates that the starting compound has reacted completely. The reaction mixture is then introduced into 2000 parts of water and the precipitate is suction filtered and washed with water to remove quaternary permethylated dye. The monomethyl compound which remains is quaternized in the usual way in 200 parts by volume of glacial acetic acid with ethylene oxide at 60° C. After the reaction is over, the mixture is introduced into 2000 parts of water and the dye is isolated after it has been precipitated with sodium formate. A dark blue powder is obtained which dyes acrylonitrile polymers fast blue shades.

EXAMPLE 10

20.7 parts of the compound having the formula:

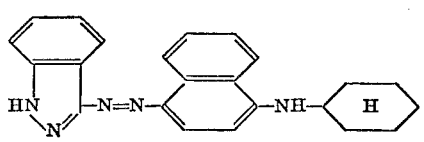

dissolved in 200 parts of glacial acetic acid is quaternized at 60° C. with 13 parts of dimethyl sulfate and by passing in ethylene oxide at the same time. After the reaction is over, the reaction mixture is diluted with 2000 parts of water and the dye mixture is precipitated with 200 parts by volume of sodium chloride solution and isolated. The dark blue powder obtained dyes acrylonitrile polymers fast blue shades.

Dyes characterized in the following Table by specifying their substituents may be obtained by methods analogous to those described in the Examples:

All the dyes in the Table give blue dyeings on acrylonitrile polymers:

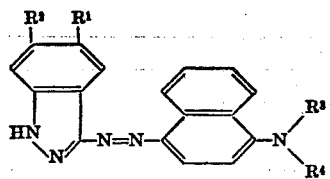

| Ex. | R¹ | R² | R³ | R⁴ | Epoxide |
|---|---|---|---|---|---|
| 11 | H | H | H | —⟨phenyl⟩—OC₂H₅ | Ethylene oxide. |
| 12 | H | H | H | Same as above | 1,2-propylene oxide. |
| 13 | H | H | H | do | Glycidyl alcohol. |
| 14 | H | H | H | do | Glycidyl ethyl ether. |
| 15 | H | H | H | do | Glycidamide. |
| 16 | H | Cl | H | do | Ethylene oxide. |
| 17 | H | Cl | H | do | 1,2-propylene oxide. |
| 18 | H | Cl | H | do | Epichlorohydrin. |
| 19 | H | Cl | H | do | Glycidamide. |
| 20 | NO₂ | H | H | do | Ethylene oxide. |
| 21 | NO₂ | H | H | do | Epichlorohydrin. |
| 22 | —SO₂—NH₂ | H | H | do | Ethylene oxide. |
| 23 | —SO₂NH—CH₃ | H | H | do | Do. |
| 24 | —SO₂—N(CH₃)₂ | H | H | do | Do. |
| 25 | —SO₂—N(CH₃)₂ | H | H | do | Epichlorohydrin. |
| 26 | —SO₂NH—(CH₂)₃—OCH₃ | H | H | do | Ethylene oxide. |
| 27 | —SO₂—N⟨pyrrolidine⟩ | H | H | do | Do. |
| 28 | Same as above | H | H | do | Epichlorohydrin. |
| 29 | do | H | H | do | Glycidyl phenyl ether. |
| 30 | —SO₂—N⟨morpholine⟩O | H | H | do | Ethylene oxide. |
| 31 | Same as above | H | H | do | 1,2-propylene oxide. |
| 32 | do | H | H | do | Epichlorohydrin. |
| 33 | —SO₂—NH—⟨cyclohexyl H⟩ | H | H | do | Ethylene oxide. |
| 34 | Same as above | H | H | do | Epichlorohydrin. |
| 35 | —SO₂—NH—CH₂—⟨phenyl⟩ | H | H | do | Ethylene oxide. |
| 36 | Same as above | H | H | do | Epichlorohydrin. |
| 37 | —SO₂—CH₂—CH₂—COOH | H | H | do | Ethylene oxide. |
| 38 | —SO₂—CH₃ | H | H | do | Do. |
| 39 | —SO₂—CH₃ | H | H | do | Epichlorohydrin. |
| 40 | H | H | H | ⟨cyclohexyl H⟩ | Do. |
| 41 | H | H | H | Same as above | 1,2-propylene oxide. |
| 42 | H | H | H | do | Glycidyl alcohol. |
| 43 | H | H | H | do | Glycidyl phenyl ether. |
| 44 | H | H | H | do | Glycidyl ethyl ether. |
| 45 | H | H | H | do | Glycidamide. |
| 46 | H | Cl | H | do | Ethylene oxide. |
| 47 | H | Cl | H | do | Epichlorohydrin. |
| 48 | H | Cl | H | do | Glycidamide. |
| 49 | NO₂ | H | H | do | Ethylene oxide. |
| 50 | —SO₂—NH₂ | H | H | do | Do. |
| 51 | —SO₂NHCH₃ | H | H | do | Do. |
| 52 | —SO₂N(CH₃)₂ | H | H | do | Do. |
| 53 | —SO₂—NH—(CH₂)₃—OCH₃ | H | H | do | Do. |
| 54 | —SO₂N⟨pyrrolidine⟩ | H | H | do | Do. |
| 55 | Same as above | H | H | do | Epichlorohydrin. |
| 56 | —SO₂—N⟨morpholine⟩O | H | H | do | Do. |
| 57 | Same as above | H | H | do | Ethylene oxide. |
| 58 | do | H | H | do | Glycidyl phenyl ether. |
| 59 | do | H | H | do | Glycidyl ethyl ether. |
| 60 | —SO₂—N⟨ ⟩SO₂ | H | H | do | Ethylene oxide. |
| 61 | —SO₂—NH—⟨cyclohexyl H⟩ | H | H | do | Do. |
| 62 | —SO₂—NH—CH₂—⟨phenyl⟩ | H | H | do | Do. |

TABLE—Continued

| Ex. | R4 | R2 | R3 | R4 | Epoxide |
|---|---|---|---|---|---|
| 63 | $-SO_2-NH-\phenyl$ | H | H | $-\phenyl-H$ | Ethylene oxide. |
| 64 | $-SO_2-CH_2-CH_2-COOH$ | H | H | Same as above | Do. |
| 65 | H | H | H | $-\phenyl-CH_3$ | Do. |
| 66 | H | Cl | H | Same as above | Do. |
| 67 | $NO_2$ | H | H | do | Do. |
| 68 | $-SO_2-N\text{(piperidyl)}$ | H | H | do | Do. |
| 69 | H | H | H | do | Epichlorohydrin. |
| 70 | H | H | H | do | 1,2-propylene oxide. |
| 71 | H | H | H | do | Glycidamide. |
| 72 | H | Cl | H | do | Do. |
| 73 | H | Cl | H | do | Epichlorohydrin. |
| 74 | H | H | H | $-\phenyl-OH$ | Ethylene oxide. |
| 75 | H | H | H | $-\phenyl-O-CH_3$ | Do. |
| 76 | H | H | H | $-\phenyl-NH_2$ | Do. |
| 77 | H | H | H | $-\phenyl-NH-CO-CH_3$ | Do. |
| 78 | H | H | H | Same as above | Epichlorohydrin. |
| 79 | H | H | H | do | Glycidamide. |
| 80 | H | H | H | do | 1,2-propylene oxide. |
| 81 | H | H | $CH_3$ | $CH_3$ | Ethylene oxide. |
| 82 | H | H | $CH_3$ | $CH_3$ | 1,2-propylene oxide. |
| 83 | H | H | $CH_3$ | $CH_3$ | Epichlorohydrin. |
| 84 | H | H | $CH_3$ | $CH_3$ | Glycidamide. |
| 85 | H | H | $CH_3$ | $CH_3$ | Glycidyl ethyl ether. |
| 86 | H | Cl | $CH_3$ | $CH_3$ | Ethylene oxide. |
| 87 | H | Cl | $CH_3$ | $CH_3$ | Epichlorohydrin. |
| 88 | $NO_2$ | H | $CH_3$ | $CH_3$ | Ethylene oxide. |
| 89 | $SO_2-NH-\phenyl$ | H | $CH_3$ | $CH_3$ | Do. |
| 90 | H | H | H | $C_2H_5$ | Do. |
| 91 | H | H | H | $C_2H_5$ | Glycidyl phenyl ether. |
| 92 | H | H | H | $C_2H_5$ | Epichlorohydrin. |
| 93 | H | Cl | H | $C_2H_5$ | Ethylene oxide |
| 94 | H | Cl | H | $C_2H_5$ | Epichlorohydrin. |
| 95 | $SO_2-NH-\phenyl-H$ | H | H | $C_2H_5$ | Ethylene oxide. |

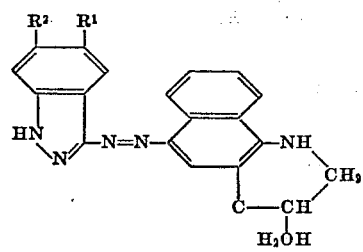

| Ex. | R1 | R2 | Epoxide | Shade |
|---|---|---|---|---|
| 96 | H | H | Ethylene oxide. | Blue. |
| 97 | H | Cl | do | Do. |
| 98 | $-SO_2-NH-\phenyl$ | H | do | Do. |
| 99 | H | Cl | Epichlorohydrin. | Do. |
| 100 | H | H | Glycidamide | Do. |
| 101 | H | H | Glycidyl alcohol. | Do. |

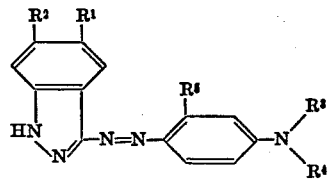

| Ex. | R¹ | R² | R³ | R⁴ | R⁵ | Epoxide | Shade |
|---|---|---|---|---|---|---|---|
| 102 | H | H | CH₃ | CH₃ | H | Ethylene oxide | Violet. |
| 103 | H | H | C₂H₅ | C₂H₅ | H | do | Do. |
| 104 | H | H | C₂H₅ | C₂H₅ | H | 1,2-propylene oxide | Do. |
| 105 | H | H | C₂H₅ | C₂H₅ | H | Epichlorohydrin | Do. |
| 106 | H | H | C₂H₅ | C₂H₅ | H | Glycidyl phenyl ether | Do. |
| 107 | H | H | C₂H₅ | C₂H₅ | H | Glycidamide | Do. |
| 108 | H | Cl | C₂H₅ | C₂H₅ | H | Ethylene oxide | Do. |
| 109 | H | Cl | C₂H₅ | C₂H₅ | H | Epichlorohydrin | Do. |
| 110 | H | Cl | C₂H₅ | C₂H₅ | H | Glycidamide | Do. |
| 111 | NO₂ | H | C₂H₅ | C₂H₅ | H | Ethylene oxide | Do. |
| 112 | —SO₂—NH₂ | H | C₂H₅ | C₂H₅ | H | do | Do. |
| 113 | —SO₂—NH₂ | H | C₂H₅ | C₂H₅ | H | Epichlorohydrin | Do. |
| 114 | —SO₂—NH—CH₃ | H | C₂H₅ | C₂H₅ | H | Ethylene oxide | Do. |
| 115 | —SO₂—N(CH₃)₂ | H | C₂H₅ | C₂H₅ | H | do | Do. |
| 116 | —SO₂—N(CH₃)₂ | H | C₂H₅ | C₂H₅ | H | 1,2-propylene oxide | Do. |
| 117 | —SO₂—N(CH₃)₂ | H | C₂H₅ | C₂H₅ | H | Epichlorohydrin | Do. |
| 118 | —SO₂—N(CH₃)₂ | H | C₂H₅ | C₂H₅ | H | Glycidamide | Do. |
| 119 | —SO₂—NH—(CH₂)₃—CH₃ | H | C₂H₅ | C₂H₅ | H | Ethylene oxide | Do. |
| 120 | —SO₂—NH—cyclohexyl | H | C₂H₅ | C₂H₅ | H | do | Do. |
| 121 | —SO₂—NH—phenyl | H | C₂H₅ | C₂H₅ | H | do | Do. |
| 122 | —SO₂—N(2,6-dimethylmorpholino) | H | C₂H₅ | C₂H₅ | H | do | Do. |
|  |  | H | C₂H₅ | C₂H₅ | H |  |  |
| 123 | —SO₂—N(thiomorpholine-S,S-dioxide) | H | C₂H₅ | C₂H₅ | H | do | Do. |
| 124 | —SO₂—N(phenyl)(CH₂—COOH) | H | C₂H₅ | C₂H₅ | H | do | Do. |
| 125 | —SO₂—(CH₂)₂CN | H | C₂H₅ | C₂H₅ | H | do | Do. |
| 126 | —SO₂—(CH₂)₂—CO—NH₂ | H | C₂H₅ | C₂H₅ | H | do | Do. |
| 127 | —SO₂—(CH₂)₂—COOH | H | C₂H₅ | C₂H₅ | H | do | Do. |
| 128 | —SO₃—CH₃ | H | C₂H₅ | C₂H₅ | H | do | Do. |
| 129 | H | Cl | C₂H₅ | C₂H₅ | —NH—CO—CH₃ | do | Do. |
| 130 | H | Cl | C₂H₅ | C₂H₅ | —NH—CO—CH₃ | Epichlorohydrin | Do. |
| 131 | —SO₂—N(pyrrolidinyl) | H | C₂H₅ | C₂H₅ | —NH—CO—CH₃ | Ethylene oxide | Do. |
| 132 | H | Cl | H | phenyl | H | do | Do. |
| 133 | NO₂ | H | CH₃ | —C₆H₄—O—C₂H₅ | H | do | Blue. |
| 134 | H | H | CH₃ | Same as above | H | do | Violet. |

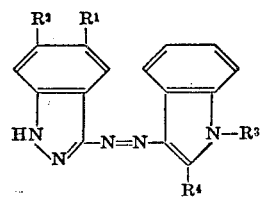

| Ex. | R¹ | R² | R³ | R⁴ | Epoxide | Shade |
|---|---|---|---|---|---|---|
| 135 | H | H | H | $CH_3$ | Ethylene oxide | Orange. |
| 136 | H | H | H | $CH_3$ | 1,2-propylene oxide | Do. |
| 137 | H | H | H | $CH_3$ | Epichlorohydrin | Do. |
| 138 | H | H | H | $CH_3$ | Glycidyl phenyl ether | Do. |
| 139 | H | H | H | $CH_3$ | Glycidamide | Do. |
| 140 | H | Cl | H | $CH_3$ | Ethylene oxide | Do. |
| 141 | $-SO_2-N(CH_3)_2$ | H | H | $CH_3$ | ...do... | Do. |
| 142 | $-SO_2-N\langle pyrrolidine \rangle$ | H | H | $CH_3$ | ...do... | Do. |
| 143 | $-SO_2-NH-C_6H_5$ | H | H | $CH_3$ | ...do... | Do. |
| 144 | H | H | $-(CH_2)_2CN$ | $CH_3$ | ...do... | Do. |
| 145 | H | H | H | $C_6H_5$ | 1,2-propylene oxide | Scarlet. |
| 146 | H | H | H | $C_6H_5$ | Glycidamide | Do. |
| 147 | H | H | $CH_3$ | $C_6H_5$ | Ethylene oxide | Do. |
| 148 | H | Cl | $CH_3$ | $C_6H_5$ | ...do... | Do. |
| 149 | H | Cl | H | $C_6H_5$ | ...do... | Do. |
| 150 | $-SO_2-N\langle morpholine \rangle$ | H | H | $C_6H_5$ | ...do... | Do. |
| 151 | H | H | $-(CH_2)_2-CN$ | $C_6H_5$ | ...do... | Reddish orange. |
| 152 | H | H | $-(CH_2)_2-CO-NH_2$ | $C_6H_5$ | ...do... | Do. |
| 153 | H | Cl | $-(CH_2)_2-CO-NH_2$ | $C_6H_5$ | ...do... | Do. |
| 154 | H | Cl | $-(CH_2)_2-CO-NH_2$ | $C_6H_5$ | Epichlorohydrin | Do. |
| 155 | H | Cl | $-(CH_2)_2-CO-NH_2$ | $C_2H_5$ | Glycidamide | Do. |
| 156 | H | H | $-(CH_2)_2-COOH$ | $C_6H_5$ | Ethylene oxide | Do. |
| 157 | H | H | $-(CH_2)_2-COOH$ | $C_6H_5$ | Epichlorohydrin | Do. |

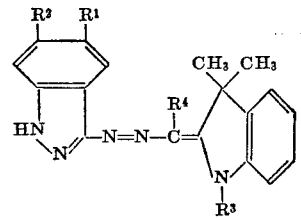

| Ex. | R¹ | R² | R³ | R⁴ | Epoxide | Shade |
|---|---|---|---|---|---|---|
| 158 | H | H | $CH_3$ | H | Ethylene oxide | Orange. |
| 159 | H | Cl | $CH_3$ | H | ...do... | Scarlet. |
| 160 | H | H | $CH_3$ | CN | ...do... | Reddish orange. |
| 161 | H | Cl | $CH_3$ | CN | ...do... | Do. |
| 162 | $-SO_2-N\langle pyrrolidine \rangle$ | H | $CH_3$ | CN | ...do... | Scarlet. |
| 163 | H | Cl | H | H | ...do... | Orange. |

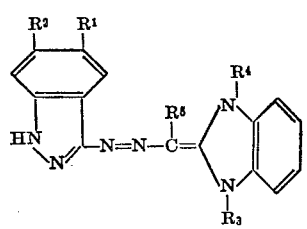

| Ex. | R¹ | R² | R³ | R⁴ | R⁵ | Epoxide | Shade |
|---|---|---|---|---|---|---|---|
| 164 | H | H | $CH_3$ | $CH_3$ | CN | Ethylene oxide | Yellow. |
| 165 | $O_2N$ | H | $CH_3$ | $CH_3$ | CN | ...do... | Do. |
| 166 | $O_2S-N\langle morpholine \rangle$ | H | $CH_3$ | $CH_3$ | CN | ...do... | Do. |
| 167 | H | H | $CH_3$ | $CH_3$ | $CO-NH_2$ | ...do... | Do. |

EXAMPLE 168

21 parts of the coupling product having the formula

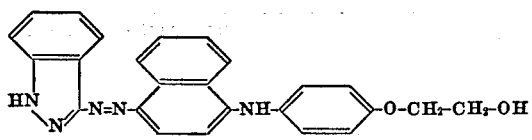

is reacted with ethylene oxide in 200 parts by volume of chlorobenzene after the addition of 1 part of p-toluenesulfonic acid and at 60° to 70° C. until the starting compound, according to thin layer chromatographic investigation, has been almost completely converted into the monoalkylated dye. Introduction of ethylene oxide is then interrupted and 6.3 parts of dimethyl sulfate is added to the reaction mixture which is then stirred for another ten hours at 60° to 70° C. The quaternary dye salt is filtered off to isolate it. It produces outstandingly fast blue shades on acrylonitrile polymers.

Dyes which are characterized in the following Table by reference to their substituents and the epoxide used for the alkylation may be obtained by methods analogous to those described in the Examples.

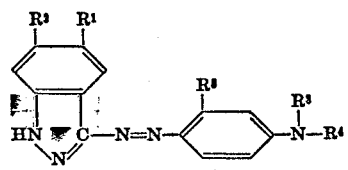

| Ex. | $R^1$ | $R^2$ | $R^3$ | $R^4$ | $R^5$ | Epoxide | Shade |
|---|---|---|---|---|---|---|---|
| 169 | $NO_2$ | H | $C_2H_5$ | $C_2H_5$ | H | Glycidyl alcohol | Blue. |
| 170 | $NO_2$ | H | $C_2H_5$ | $C_2H_5$ | $CH_3$ | Ethylene oxide | Do. |
| 171 | $NO_2$ | H | $C_2H_5$ | $-CH_2-CH_2-OH$ | $CH_3$ | do | Do. |
| 172 | $NO_2$ | H | $C_2H_5$ | $-CH_2-\phi$ | $CH_3$ | do | Do. |
| 173 | $NO_2$ | H | $C_2H_5$ | $-CH_2-\phi$ | H | do | Bluish violet. |
| 174 | $NO_2$ | H | $-CH_2-CH_2-OH$ | $-CH_2-CH_2-OH$ | $CH_3$ | do | Blue. |
| 175 | $NO_2$ | H | $-CH_2-CH_2-OH$ | $-\phi-H$ | $-NH-CO-CH_3$ | do | Do. |
| 176 | $NO_2$ | H | H | $-\phi-H$ | $CH_3$ | do | Do. |
| 177 | $NO_2$ | H | H | $-(CH_2)_3-CH_3$ | $CH_3$ | do | Bluish violet. |
| 178 | $NO_2$ | H | $-(CH_2)_3-CH_3$ | $-(CH_2)_3-CH_3$ | H | do | Blue. |
| 179 | $NO_2$ | H | H | $-\phi$ | $-NH-CO-CH_3$ | do | Do. |

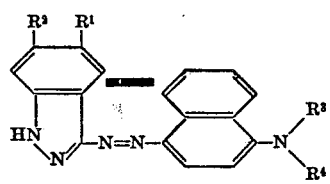

| Ex. | $R^1$ | $R^2$ | $R^3$ | $R^4$ | Epoxide | Shade |
|---|---|---|---|---|---|---|
| 180 | $-SO_2-NH-(CH_2)_3-N(C_2H_5)_2$ | H | H | $-\phi-O-C_2H_5$ | Ethylene oxide | Blue. |
| 181 | $-SO_2-NH-(CH_2)_3-OH$ | H | H | $-\phi-O-C_2H_5$ | do | Do. |
| 182 | $-SO_2-NH-(CH_2)_3-O-(CH_2)_2-OH$ | H | H | Same as above | do | Do. |
| 183 | $-SO_2-NH-(CH_2)_2-OCH_3$ | H | H | do | do | Do. |
| 184 | $-SO_2-N\langle SO_2\rangle$ | H | H | do | do | Do. |
| 185 | $-SO_2-N\langle N-CH_3\rangle$ | H | H | do | do | Do. |
| 186 | Cl | H | H | do | do | Do. |
| 187 | $-SO_2-NH-(CH_2)_3-N(C_2H_5)_2$ | H | H | $-\phi-H$ | do | Do. |

TABLE—Continued

| Ex. | R¹ | R² | R³ | R⁴ | Epoxide | Shade |
|---|---|---|---|---|---|---|
| 188 | —SO₂—NH—(CH₂)₂—N(C₂H₅)(C₂H₅) | H | H | —⟨H⟩ (cyclohexyl) | Ethylene oxide | Blue |
| 189 | —SO₂—N((CH₂)₂—OH)((CH₂)₂—OH) | H | H | Same as above | do | Do. |
| 190 | —SO₂—NH—(CH₂)₃—OH | H | H | do | do | Do. |
| 191 | —SO₂—NH—(CH₂)₂—O—(CH₂)₂—OH | H | H | do | do | Do. |
| 192 | —SO₂—NH—(CH₂)₂—OCH₃ | H | H | do | do | Do. |
| 193 | —SO₂—N⟨⟩N—CH₃ (piperazino) | H | H | do | do | Do. |
| 194 | Cl | H | H | do | do | Do. |
| 195 | —SO₂—NH—⟨⟩ | H | H | —⟨⟩—OH | do | Do. |
| 196 | Cl | H | H | Same as above | do | Do. |
| 197 | H | Cl | H | do | do | Do. |
| 198 | H | Cl | H | —⟨⟩—NH—CO—CH₃ | do | Do. |
| 199 | —SO₂—NH—⟨⟩ | H | H | Same as above | do | Do. |
| 200 | H | H | H | —⟨⟩—O—CH₂—CH₂—OH | do | Do. |
| 201 | H | H | H | Same as above | 1,2-propylene oxide | Do. |
| 202 | H | H | H | do | Epichlorohydrin | Do. |
| 203 | Cl | H | H | do | Ethylene oxide | Do. |
| 204 | Cl | H | H | do | do | Do. |
| 205 | NO₂ | H | H | do | do | Do. |
| 206 | —SO₂—NH—(CH₂)₃—OCH₃ | H | H | do | do | Do. |
| 207 | —SO₂—N⟨⟩ (pyrrolidino) | H | H | do | do | Do. |
| 208 | —SO₂—NH—⟨⟩ | H | H | do | do | Do. |

We claim:
1. A basic azo dye of the indazole series having the formula:

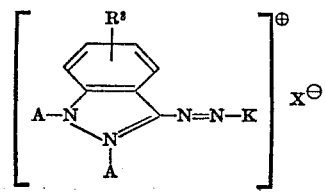

in which:

A is methyl or ethyl or the radical of the formula —CH₂—CHOH—R¹ with the proviso that not more than one A is ethyl or methyl;

R¹ is hydrogen, carbamoyl, carboxyl, hydroxymethyl, alkoxymethyl having two to seven carbon atoms, phenoxymethyl or chloromethyl; R³ is hydrogen, methyl, methoxy, chloro, nitro or —SO₂R;

R is methyl; β-cyanoethyl; β-carbamoylethyl; β-carboxyethyl; alkylamino of one to eight carbon atoms and dialkylamino of together two to eight carbon atoms with the alkyl being unsubstituted or substituted by hydroxy, β-hydroxyethoxy, alkoxy of one to four carbon atoms or dialkylamino of together two to eight carbon atoms; cyclohexylamino; benzylamino; phenylethylamino; phenylamino; pyrrolidino; piperidino; morpholino; piperazino; N-methylpiperazino; hexamethyleneimino; thiomorpholino; thiomorpholino-S-dioxide; 2,6-dimethylmorpholino; or N-carboxymethylanilino;

K is a coupling component of the formula

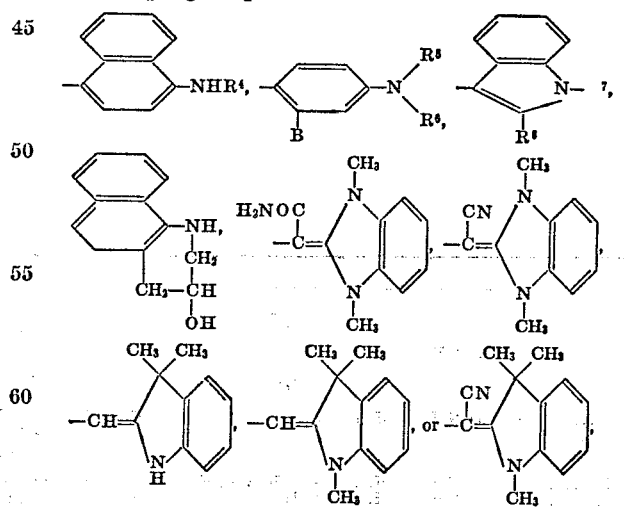

in which:

R⁴ is ethyl, cyclohexyl, p-methylphenyl, β-hydroxyethoxyphenyl, p-hydroxyphenyl, p-methoxyphenyl or p-ethoxyphenyl;

B is hydrogen, methyl or acetylamino;

R⁵ is hydrogen, methyl, ethyl, butyl, β-hydroxyethyl, β-cyanoethyl, cyclohexyl, benzyl, phenylethyl, phenyl, p-methoxyphenyl or p-ethoxyphenyl;

R⁶ is methyl, ethyl, butyl or β-hydroxyethyl;

R⁷ is hydrogen, methyl β-carboxyethyl, β-carbomoylethyl or β-cyanoethyl; and $R^8$ is methyl or phenyl; and
$X^{\ominus}$ is the anion of an inorganic or organic acid.

2. A dye as claimed in Claim 1 having the formula

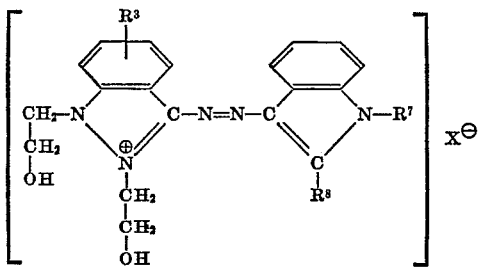

where $R^3$ and $X^{\ominus}$ have the meanings given in Claim 1;
$R^7$ is hydrogen, methyl, β-carboxyethyl, β-carbamoylethyl or β-cyanoethyl; and
$R^8$ is methyl or phenyl.

3. A dye as claimed in Claim 1 and having the formula:

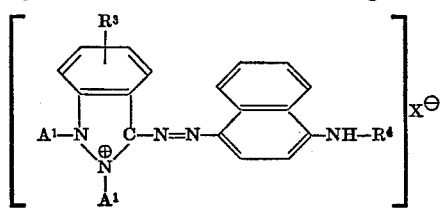

where $A^1$ denotes methyl or β-hydroxyethyl;
$R^4$ denotes ethyl, cyclohexyl, p-methylphenyl, β-hydroxyethoxyphenyl, p-hydroxyphenyl, p-methoxyphenyl or p-ethoxyphenyl;
one of the radicals $A^1$ denoting other than methyl; and
$R^3$ and $X^{\ominus}$ having the meanings given in Claim 1.

4. A dye as claimed in Claim 1 and having the formula:

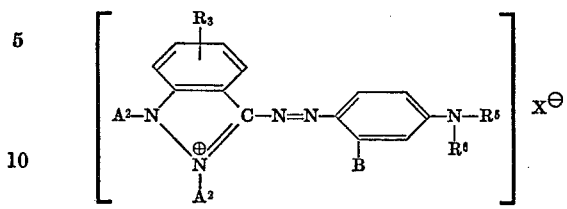

where $A^2$ denotes methyl, β-hydroxyethyl or β-hydroxy-γ-chloropropyl;
B denotes hydrogen, methyl or acetylamino;
$R^5$ denotes hydrogen, methyl, ethyl, butyl, β-hydroxyethyl, β-cyanoethyl, cyclohexyl, benzyl, phenylethyl, phenyl, p-methoxyphenyl or p-ethoxyphenyl;
$R^6$ denotes methyl, ethyl, butyl or β-hydroxyethyl;
one of the radicals $A^2$ is not methyl;
and $R^3$ and $X^{\ominus}$ have the meanings given in Claim 1.

References Cited

UNITED STATES PATENTS 3,697,501　10/1972　Dehnert _____ 260—16.3
3,726,852　4/1973　Calla et al. _____ 260—162

LORRAINE A. WEINBERGER, Primary Examiner

C. F. WARREN, Assistant Examiner

U.S. Cl. X.R.

260—154, 156, 158, 162, 163, 310 C

UNITED STATES PATENT OFFICE
CERTIFICATE OF CORRECTION

PATENT NO. : 3,826,800
DATED : July 30, 1974
INVENTOR(S) : Johannes Dehnert et al.

It is certified that error appears in the above-identified patent and that said Letters Patent are hereby corrected as shown below:

In Column 1, after line 6, insert "Claims priority, application Germany, September 10, 1970, P 20 44 823.1"

In Column 1, Line 58, delete "alkoxy methyl" and substitute --alkoxymethyl--

In Column 6, the formula under Example 2, the right bracket should be inserted in front of the chlorine anion so as to exclude the chlorine anion.

In Column 8, Line 9, insert after "parts" --by volume of a saturated solution of sodium chloride, 134 parts--

In Column 16, Example 155, under the column "$R^4$" of the table, delete "$C_2H_5$" and substitute --$C_6H_5$--

In Column 20, Claim 1, in the third formula, delete " $\diagdown N-^7,$ " and substitute -- $\diagdown N-R^7,$ --

Signed and Sealed this twenty-second Day of June 1976

[SEAL]

Attest:

RUTH C. MASON
Attesting Officer

C. MARSHALL DANN
Commissioner of Patents and Trademarks